B. H. MEYER.
DRAPERY CLIP.
APPLICATION FILED MAR. 29, 1920.
1,345,868. Patented July 6, 1920.
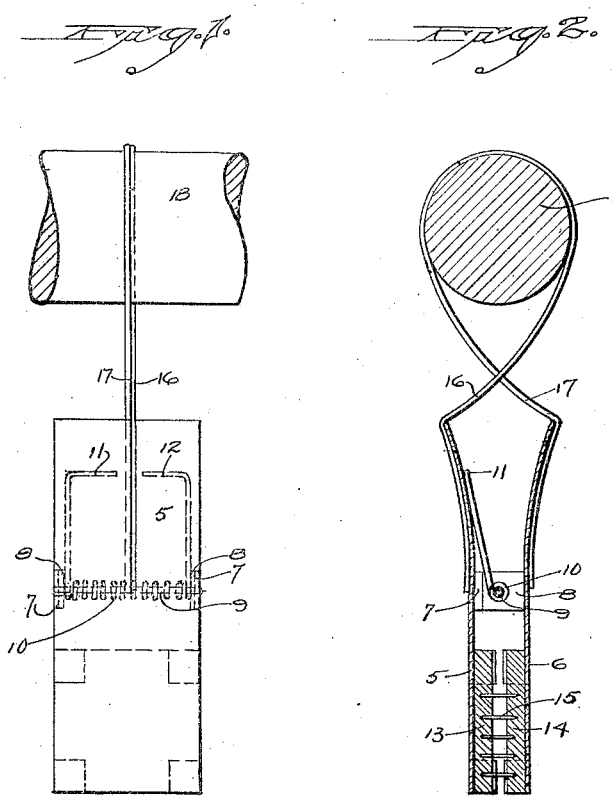

UNITED STATES PATENT OFFICE.

BERNHARD H. MEYER, OF NEW HAVEN, CONNECTICUT.

DRAPERY-CLIP.

1,345,868.   Specification of Letters Patent.   Patented July 6, 1920.

Application filed March 29, 1920. Serial No. 369,665.

*To all whom it may concern:*

Be it known that I, BERNHARD H. MEYER, a citizen of the United States, residing at New Haven, in the county of New Haven and State of Connecticut, have invented a new and useful Improvement in Drapery-Clips; and I do hereby declare the following, when taken in connection with the accompanying drawings and the characters of reference marked thereon, to be a full, clear, and exact description of the same, and which said drawings constitute part of this application, and represent, in—

Figure 1, a face view of a drapery clip constructed in accordance with my invention.

Fig. 2. A vertical sectional view of the same.

This invention relates to an improvement in drapery clips such as are adapted for connecting portières or curtains with a curtain-pole. In the more general construction, rings are employed to slide upon a pole, and hooks or other devices are connected with the drapery to be engaged with the rings, these hooks being usually sewed or pinned to the drapery. The object of this invention is to combine a spring-clip which may be connected with the drapery without sewing, and which will carry two reversely turned hooks to engage with the pole and avoid the necessity of using separately formed rings; and the invention consists in the construction as hereinafter described and particularly recited in the claim.

In carrying out my invention, the clip comprises two members 5 and 6 which may be struck up from sheet-metal and of any desired form. As herein shown, the members are provided with inwardly projecting fingers 7 and 8 through which a pintle 9 extends, whereby the members are hinged together. Upon the pintle is a spring 10, the ends 11 and 12 of which bear upon opposite members so as to normally force the lower ends together. The inner faces of these lower ends will be provided with blocks 13 and 14 of rubber, cork, or other suitable material, in each of which is mounted a series of inwardly projecting pins 15. Connected with the upper ends of the clip are arms 16 and 17 reversely bowed so as to extend around a curtain-pole 18 to support the clip thereon, the ends of the wires being so arranged that when the upper ends of the clip are pressed together, the ends of the wires will separate sufficiently to permit the device to engage with the pole, and the spring 10 is of sufficient strength to firmly hold the blocks 13 and 14 in such close engagement with the draperies that the draperies will be firmly held thereby.

I claim:

A drapery clip comprising two members hinged together by a pintle, a spring on said pintle the ends of which bear against the inner faces of the members whereby the lower ends are normally forced together, blocks mounted on the lower inner faces of the members, said blocks provided with inwardly projecting pins, and an arm connected with the upper end of each member, said arms reversely bowed and adapted to engage with a curtain-pole.

In testimony whereof, I have signed this specification in the presence of two subscribing witnesses.

BERNHARD H. MEYER.

Witnesses:
  FREDERIC C. EARLE,
  P. W. F. EICHMANN.